United States Patent
McBride et al.

(10) Patent No.: US 8,427,276 B2
(45) Date of Patent: *Apr. 23, 2013

(54) APPARATUS FOR AUTOMATICALLY INITIATING SEQUENCE OF VEHICLE FUNCTIONS

(75) Inventors: Justin P McBride, West Bloomfield, MI (US); Thomas J Keeling, Plymouth, MI (US); Keiichi Aoyama, Novi, MI (US); Tanemichi Chiba, Novi, MI (US); Michael A Wiegand, Birmingham, MI (US); Christopher M Kurpinski, Berkley, MI (US)

(73) Assignee: DENSO International America, Inc., Southfield, MI (US)

( * ) Notice: Subject to any disclaimer, the term of this patent is extended or adjusted under 35 U.S.C. 154(b) by 1112 days.

This patent is subject to a terminal disclaimer.

(21) Appl. No.: 11/362,585

(22) Filed: Feb. 24, 2006

(65) Prior Publication Data

US 2007/0200669 A1    Aug. 30, 2007

(51) Int. Cl.
| | |
|---|---|
| B60R 25/00 | (2006.01) |
| G05B 19/00 | (2006.01) |
| G05B 23/00 | (2006.01) |
| G06F 7/00 | (2006.01) |
| G06F 7/04 | (2006.01) |
| G08B 29/00 | (2006.01) |
| G08C 19/00 | (2006.01) |
| H04B 1/00 | (2006.01) |
| H04B 3/00 | (2006.01) |
| H04Q 1/00 | (2006.01) |
| H04Q 9/00 | (2006.01) |
| G06K 19/00 | (2006.01) |
| H04B 1/02 | (2006.01) |

(52) U.S. Cl.
USPC ................................. 340/5.64; 340/5.72

(58) Field of Classification Search ................ 340/5.72, 340/825.31
See application file for complete search history.

(56) References Cited

U.S. PATENT DOCUMENTS

| | | | | |
|---|---|---|---|---|
| 4,071,260 | A * | 1/1978 | Marshall, Sr. | 280/166 |
| 4,730,120 | A * | 3/1988 | Okada | 307/10.2 |
| 5,293,160 | A * | 3/1994 | Kurozu et al. | 340/5.3 |
| 6,101,428 | A * | 8/2000 | Snyder | 701/2 |
| 6,552,649 | B1 * | 4/2003 | Okada et al. | 340/5.61 |
| 6,624,741 | B1 * | 9/2003 | Dais et al. | 340/5.72 |
| 7,015,791 | B2 * | 3/2006 | Huntzicker | 340/5.54 |
| 7,071,817 | B2 * | 7/2006 | Haselsteiner et al. | 340/426.28 |
| 7,301,437 | B2 * | 11/2007 | Sasaki et al. | 340/5.72 |
| 2001/0054952 | A1 * | 12/2001 | Desai et al. | 340/5.72 |
| 2003/0007851 | A1 * | 1/2003 | Heigl et al. | 414/454 |
| 2003/0098781 | A1 * | 5/2003 | Baset | 340/5.72 |

(Continued)

*Primary Examiner* — Brian Zimmerman
*Assistant Examiner* — Cal Eustaquio
(74) *Attorney, Agent, or Firm* — Harness, Dickey & Pierce, P.L.C.

(57) ABSTRACT

An apparatus for automatically initiating a plurality of vehicle functions is disclosed. The apparatus includes a mobile unit and a detection device operable to automatically detect whether the mobile unit is within a first zone. The detection device is further operable to automatically detect whether the mobile unit is within a second zone. The first zone and the second zone are outside the vehicle, and the first zone encompasses the second zone. The apparatus further includes a controller that is operable to initiate a first vehicle function when the detection device detects that the mobile unit is within the first zone. The controller is also operable to initiate a second vehicle function when the detection device detects that the mobile unit is within the second zone.

17 Claims, 2 Drawing Sheets

U.S. PATENT DOCUMENTS

| | | |
|---|---|---|
| 2004/0075531 A1* | 4/2004 | Ieda et al. .................... 340/5.72 |
| 2004/0178962 A1* | 9/2004 | Brillon ......................... 343/713 |
| 2004/0189463 A1* | 9/2004 | Wathen ..................... 340/539.1 |
| 2005/0168322 A1* | 8/2005 | Appenrodt et al. .......... 340/5.72 |
| 2005/0224700 A1* | 10/2005 | Petra ............................. 250/221 |
| 2007/0024416 A1* | 2/2007 | Tang et al. ................... 340/5.61 |

* cited by examiner

APPARATUS FOR AUTOMATICALLY INITIATING SEQUENCE OF VEHICLE FUNCTIONS

FIELD OF THE INVENTION

The present invention relates to an apparatus for initiating vehicle functions and, more particularly, relates to an apparatus for automatically initiating a sequence of vehicle functions.

BACKGROUND OF THE INVENTION

Vehicular door unlocking devices permit unlocking of vehicle doors in a variety of ways. In traditional systems, a key is inserted into a locking mechanism mounted to the vehicle door, and the door is unlocked by manually turning the key. In more modern systems a user pushes buttons on a remote control to remotely unlock or lock the vehicle door. In other so-called "Smart Key" systems, a key fob automatically establishes wireless communication with the vehicle when the fob is within range of the vehicle. The vehicle door is subsequently changed from a locked state to an unlock-standby state, and the door can then be opened with the door handle.

In many of these systems, other vehicle functions are initiated when the vehicle doors are unlocked. For instance, the interior vehicle lights are illuminated, the exterior lamps are illuminated, the horn sounds, or other sounds are generated when the vehicle doors are unlocked. These "welcome" functions may help the vehicle owner distinguish the vehicle from others in a crowded parking lot, for instance. The "welcome" functions may also ward off nefarious individuals located near the vehicle.

One problem with these prior art systems is that the "welcome" functions occur at approximately the same time as the door unlocking event. For instance, in the "Smart Key" system described above, the door unlocking event and any "welcome" functions are initiated once the key fob is relatively close to the vehicle. As such, the "welcome" functions may not help the user distinguish the vehicle from others, and the "welcome" functions may not ward off undesirable persons near the vehicle. Accordingly, there remains a need for a system that automatically initiates the "welcome" functions independent of the unlocking event.

SUMMARY OF THE INVENTION

An apparatus for automatically initiating a plurality of vehicle functions is disclosed. The apparatus includes a mobile unit and a detection device operable to automatically detect whether the mobile unit is within a first zone. The detection device is further operable to automatically detect whether the mobile unit is within a second zone. The first zone and the second zone are outside the vehicle, and the first zone encompasses the second zone. The apparatus further includes a controller that is operable to initiate a first vehicle function when the detection device detects that the mobile unit is within the first zone. The controller is also operable to initiate a second vehicle function when the detection device detects that the mobile unit is within the second zone.

In another aspect, the present disclosure relates to a method of initiating a plurality of vehicle functions. The method includes the step of detecting when a mobile unit is within a first zone outside the vehicle. The method also includes the step of detecting when the mobile unit is within a second zone outside the vehicle, wherein the first zone encompasses the second zone. The method further includes the step of causing a first vehicle function when the mobile unit is detected within the first zone. In addition, the method includes the step of causing a second vehicle function when the mobile unit is detected within the second zone.

In still another aspect, the present disclosure relates to an apparatus for automatically initiating a plurality of vehicle functions. The apparatus includes a mobile unit and a detection device operable to transmit a first interrogation signal within a first zone. The mobile unit transmits a first identification signal in response to the first interrogation signal when the mobile unit is disposed within the first zone. The detection device is further operable to automatically detect whether the mobile unit is within the first zone by matching the first identification to a first predetermined identifier. The detection device is operable to transmit a second interrogation signal within a second zone, wherein the mobile unit transmits a second identification signal in response to the second interrogation signal when the mobile unit is disposed within the second zone. The detection device is further operable to automatically detect whether the mobile unit is within the second zone by matching the second identification to a second predetermined identifier. The first zone and second zone are outside the vehicle, and the first zone encompasses the second zone. The apparatus also includes a controller operable to initiate a vehicle light to illuminate when the detection device detects that the mobile unit is within the first zone. The controller is further operable to initiate a vehicle closure to enter an unlock-standby state when the detection device detects that the mobile unit is within the second zone.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
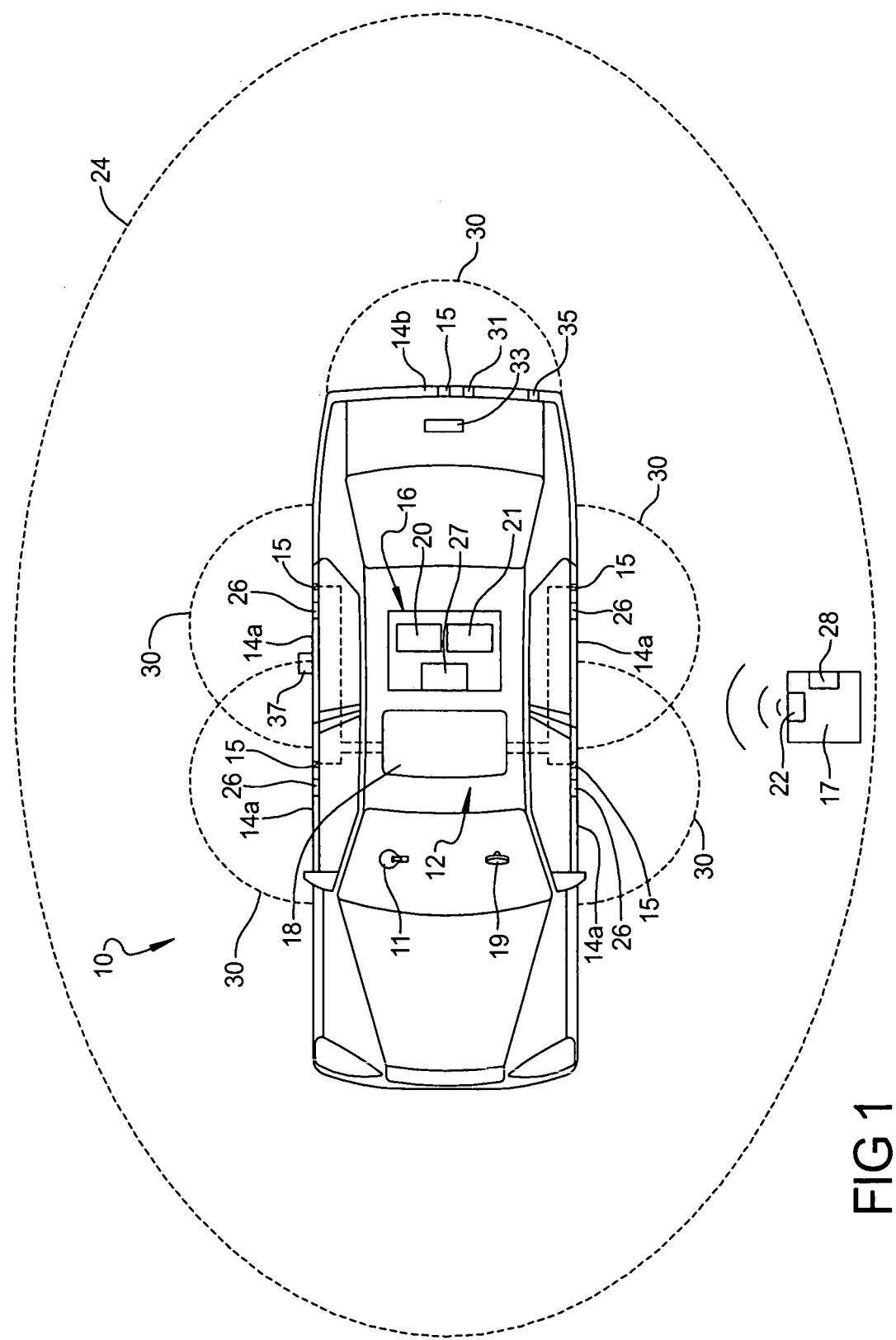
FIG. 1 is a top view of a vehicle equipped with a vehicle control apparatus.

Referring to FIG. 1, a vehicle 10 is illustrated that includes a vehicle control apparatus generally indicated at 12. As will be explained in greater detail below, the vehicle control apparatus 12 is useful for operating a plurality of vehicle functions in sequence.

In the embodiment shown, the vehicle 10 includes a plurality of closures 14. More specifically, the vehicle 10 includes a plurality of passenger compartment closures (i.e., vehicle doors) 14a and a trunk closure 14b. Those having ordinary skill in the art will appreciate that the vehicle control apparatus 12 could be employed in any suitable vehicle 10 having any suitable configuration of closures 14, such as hingeably attached doors, sliding doors, hatchbacks, gates, and the like. Each of the closures 14 includes a closure locking mechanism 15, which can be changed between a locked state, an unlock-standby state, and an unlocked state in a manner to be described below. The vehicle 10 also includes at least one light 11 and at least one speaker 19. The light 11 can be an interior light of the vehicle 10 and/or the light 11 can be an exterior light of the vehicle 10. The speaker 19 can be an interior speaker of the vehicle 10 and/or the speaker can be an exterior speaker of the vehicle 10, such as the horn of the vehicle 10.

The vehicle control apparatus 12 includes a detection device 16, a mobile unit 17, and a controller 18. The detection device 16 and the controller 18 are mounted to the vehicle 10, and the mobile unit 17 is portable. In one embodiment, the mobile unit 17 is small enough to be held by the user in a pocket, purse, or other article. As will be explained in greater detail below, the detection device 16 is operable to detect the position of the mobile unit 17. The controller 18 is operable to cause a plurality of vehicle functions in sequence depending on the position of the mobile unit 17 relative to the detection device 16. For instance, as the user approaches the vehicle 10 with the mobile unit 17, the detection device 16 eventually detects the mobile unit 17 approaching, and the controller 18 will, in turn, initiate a first vehicle function, such as illuminating the light 11 and/or cause the speaker 19 to create a sound to thereby "welcome" the user. The sound may be a horn, music, etc. Then, as the detection device 16 detects that the mobile unit 17 is even closer to the vehicle 10, the controller 18 will initiate a second vehicle function, such as changing the closure 14 from a locked state to an unlock-standby state. It will be appreciated that the first vehicle function and the second vehicle functions could be of any suitable type without departing from the scope of the present disclosure. As such, the first vehicle function(s) (i.e., the "welcome" functions) are initiated independent of the second vehicle functions (e.g., the unlocking of the vehicle closures 14). Thus, the lights and/or sounds can help the user distinguish the vehicle 10 from others and/or ward off undesirable persons from the vehicle 10 while the user is still relatively far away from the vehicle 10, and yet the vehicle closures 14 will unlock when the user is relatively close to the vehicle for added security.

As shown in FIG. 1, the detection device 16 includes a first antenna 20 and a first receiver 21, each of which are mounted to the vehicle 10. The mobile unit 17 includes a first transponder 22. The first antenna 20 transmits a first interrogation signal outward from the vehicle 10 in a polling fashion. When the mobile unit 17 is within range and receives the first interrogation signal, the first transponder 22 responds by transmitting a first identification signal. The first identification signal is received by the first receiver 21. Then, the detection device 16 matches the first identification signal to a predetermined identifier, such as a code stored in computer memory. If the first identification signal matches the predetermined identifier, the detection device 16 has validated and identified that the mobile unit 17 is located within a certain range of the vehicle 10.

More specifically, as illustrated in FIG. 1, the detection device 16 is able to communicate with the mobile unit 17 within a first zone 24. In other words, when the mobile unit 17 is within the first zone 24, the first transponder 22 is able to receive the first interrogation signal from the first antenna 20, and the first receiver 21 is able to receive the first identification signal transmitted in response from the first transponder 22. Accordingly, the detection device 16 is able to determine whether the mobile unit 17 is located within the first zone 24 in the manner described above.

In one embodiment, the first interrogation signal and the first identification signal are radio frequency (RF) signals transmitted at 315 MHz. Those having ordinary skill in the art will appreciate, however, that the first interrogation signal and the first identification signal could be of any suitable type and frequency without departing from the scope of the present disclosure.

The detection device 16 also includes a plurality of second antennae 26 and at least one second receiver 27. In the embodiment shown, each of the second antennae 26 is mounted adjacent one of the vehicle closures 14. The mobile unit 17 also includes a second transponder 28. Each of the second antennae 26 is operable to transmit a second interrogation signal outward from the vehicle 10. In one embodiment, the second antennae 26 transmits the second interrogation signal only after the detection device 16 detects that the mobile unit 17 is within the first zone 24 to conserve energy. When the mobile unit 17 is within range of one of the second antennae 26 and receives the second interrogation signal, the second transponder 28 responds by transmitting a second identification signal. The second receiver 27 receives the second identification signal, and the detection device 16 matches the second identification signal to a predetermined identifier to thereby validate the mobile unit 17 and to detect that the mobile unit 17 is within range of the second antenna 26.

More specifically, as illustrated in FIG. 1, the detection device 16 is able to communicate with the mobile unit 17 when the mobile unit 17 is within a second zone 30. In other words, when the mobile unit 17 is within one of the second zones 30, the second transponder 28 is able to receive the second interrogation signal from the corresponding second antenna 26, and the second receiver 27 is able to receive the second identification signal transmitted in response from the second transponder 28. Accordingly, the detection device 16 is able to determine whether the mobile unit 17 is located within one of the second zones 30 in the manner described above.

In one embodiment, the second interrogation signal and the second identification signal are low frequency (LF) signals that are transmitted at 125 kHz. As such, the LF signals are created via magnetic coupling, and the magnetic field is generated with a transmitter coil, usually together with a capacitor to generate a resonance circuit as is generally known. Those having ordinary skill in the art will appreciate, however, that the second interrogation signal and the second identification signal could be of any suitable type and frequency without departing from the scope of the present disclosure. For instance, the second interrogation signal and the second identification signal may be radio frequency (RF) signals, as in the first interrogation signal and the first identification signal. In such a configuration, all interrogation signals and all identification signals, regardless of zones, would utilize radio frequency (RF) signals. Furthermore, in the event that radio frequency signals are solely utilized, distances of the mobile unit 17 from the vehicle 10 may be measured by the strength of received signals, as is known in the art. For instance, the distance of the mobile unit 17 from the detection device 16, may be measured by the strength of any radio frequency signal received by the detection device 16 from the mobile unit 17.

In one embodiment, each of the second zones 30 has a radius of approximately three feet from the vehicle 10. The first zone 24 extends significantly further from the vehicle 10. As shown, the first zone 24 overlaps and encompasses each of the second zones 30. Accordingly, as the user approaches the vehicle 10, the mobile unit 17 will be in communication with the first antenna 20 before the mobile unit 17 is in communication with the second antennae 26 and second receiver 27.

In one embodiment, the boundary of the first zone 24 is ultimately determined by the strength of the first interrogation signal and the first identification signal, and the mobile unit 17 effectively "enters the first zone" as soon as the first transponder 22 begins communicating with the detection device 16. Likewise, the boundary of the second zones 30 is ultimately determined by the strength of the second interrogation signal and the strength of the second identification signal, and the mobile unit 17 effectively "enters the second zone" as soon as the second transponder 28 begins communicating with the detection device 16. Again, each zone may utilize different signals, such as radio frequency (RF) signals for the first volley of communications when approaching the vehicle 10 and low frequency (LF) signals for the second volley of communications when closer to the vehicle 10, or radio frequency (RF) and distance measuring may be used for all communications.

In another embodiment, the detection device 16 includes programmed logic that determines the distance between the detection device 16 and the mobile unit 17 based on the strength of the first and/or second identification signal in a manner that is generally known in the art. As such, the boundary of the first zone 24 is predetermined, and the mobile unit 17 effectively "enters the first zone" as soon as the strength of the first identification signal indicates that the mobile unit 17 is within the boundary of the first zone 24. Likewise, the boundary of the second zone 30 is predetermined, and the mobile unit 17 effectively "enters the second zone" as soon as the strength of the second identification signal indicates that the mobile unit 17 is within the boundary of the second zone 30.

Thus, the detection device 16 can detect whether the mobile unit 17 is within the first zone 24 or the second zone 30. As the user enters the first zone 24 with the mobile unit 17, the controller 18 initiates a first vehicle function. The first vehicle function can be of any suitable type, such as illuminating the light 11, creating a sound with the speaker 19, turning on the vehicle's ignition, or otherwise. Accordingly, by initiating the first vehicle function, the vehicle 10 "welcomes" the user. This can be useful for distinguishing the user's vehicle from others in a crowded parking lot, for warding off undesirable people near the vehicle 10, or otherwise.

As the user further approaches the vehicle 10, and the mobile unit 17 coincidently enters one of the second zones 30, the controller 18 initiates a second vehicle function. In one embodiment, the second vehicle function occurs by changing the locking mechanism 15 from a locked state to an unlock-standby state. Each closure has a contact sensor, and once the locking mechanism 15 is in the unlock-standby state, the locking mechanism 15 unlocks when the contact sensor is contacted and the door handle is pulled. This second vehicle function is disclosed in commonly owned U.S. Patent Application Publication 2004/0119628, which is hereby incorporated herein by reference.

As shown in FIG. 1 and as mentioned above, the detection device 16 generates a plurality of second zones 30, and in this embodiment, when the mobile unit 17 moves into one of the second zones 30, only the locking mechanism 15 corresponding to that second zone 30 changes from the locked state to the unlock-standby state. Thus, if the user approaches the driver's side door, the mobile unit 17 will enter the second zone 30 adjacent the driver's side door, and the detection device 16 will detect that the mobile unit 17 has entered the second zone 30 adjacent the driver's side door. The controller 18 will cause the locking mechanism 15 of the driver's side door to change from a locked state to an unlock-standby state. Then, the locking mechanism 15 will unlock and the driver's side door can be opened by contacting and pulling on the door handle of the driver's side door as described in U.S. Patent Application Publication No. 2004/0119628, which is hereby incorporated by reference.

In one embodiment, the controller 18 automatically opens the vehicle closure 14 in a manner disclosed in co-owned patent application Ser. No. 11/301,076, filed Dec. 12, 2005, which is hereby incorporated by reference in its entirety. In this embodiment, the vehicle 10 includes a closure release solenoid 31 and an actuator 33. The solenoid 31 and the actuator can be associated with any of the closures 14. The closure release solenoid 31 causes the locking mechanism 15 to release the corresponding closure 14 so that the closure 14 is capable of being opened after it is unlocked. Although a closure release solenoid 31 is described as the means of unlatching, any type of latching means could be employed, such as electric or magnetic latching. Once the closure 14 is unlatched, the actuator 33 releases stored energy from a biasing member or other energy storage device to cause the vehicle closure 14 to open automatically. As such, when the mobile device 17 enters the second zone, the corresponding vehicle closure 14 automatically opens for the convenience of the user.

In one embodiment, the vehicle 10 includes an opener switch 35, and the controller 18 energizes the opener switch 35 when the mobile unit 17 enters one of the second zones 30. In one embodiment, the opener switch 35 is a laser emitter, such as that disclosed in co-owned patent application Ser. No. 11/301,076, filed Dec. 12, 2005, which is hereby incorporated by reference in its entirety. Once energized, the laser emitter emits a laser directed outside the vehicle. The user can break the laser beam by obstructing the path of the beam with a foot or other object, which causes the closure release solenoid 31 to release the corresponding closure 14 and allows the actuator 33 to open the vehicle closure 14. It will be appreciated that other opener switches 35 could be employed without departing from the scope of the present disclosure.

Moreover, in one embodiment, the vehicle 10 includes a vehicle ingress/egress device 37, such as a ramp, a step, or other similar device. The ingress/egress device 37 can be actuated toward and away from the vehicle. In the retracted position, the ingress/egress device 37 is disposed nearer the vehicle 10, and in an extended position, the ingress/egress device 37 is extended away from the vehicle 10 to aid a user in getting into or out of the vehicle 10. In this embodiment, the controller 18 actuates the ingress/egress device 37 from the retracted position to the extended position automatically when the mobile unit 17 enters one of the second zones 30.

Furthermore, in one embodiment, the controller 18 is further operable to automatically terminate the first vehicle function. For example, if the user enters the first zone 24 and the controller 18 causes the light 11 to illuminate, but then the user does not enter one of the second zones 30 within a predetermined time, the controller 18 automatically turns off the light 11. Accordingly, the controller 18 terminates the first vehicle function to thereby conserve energy.

Figure 2:
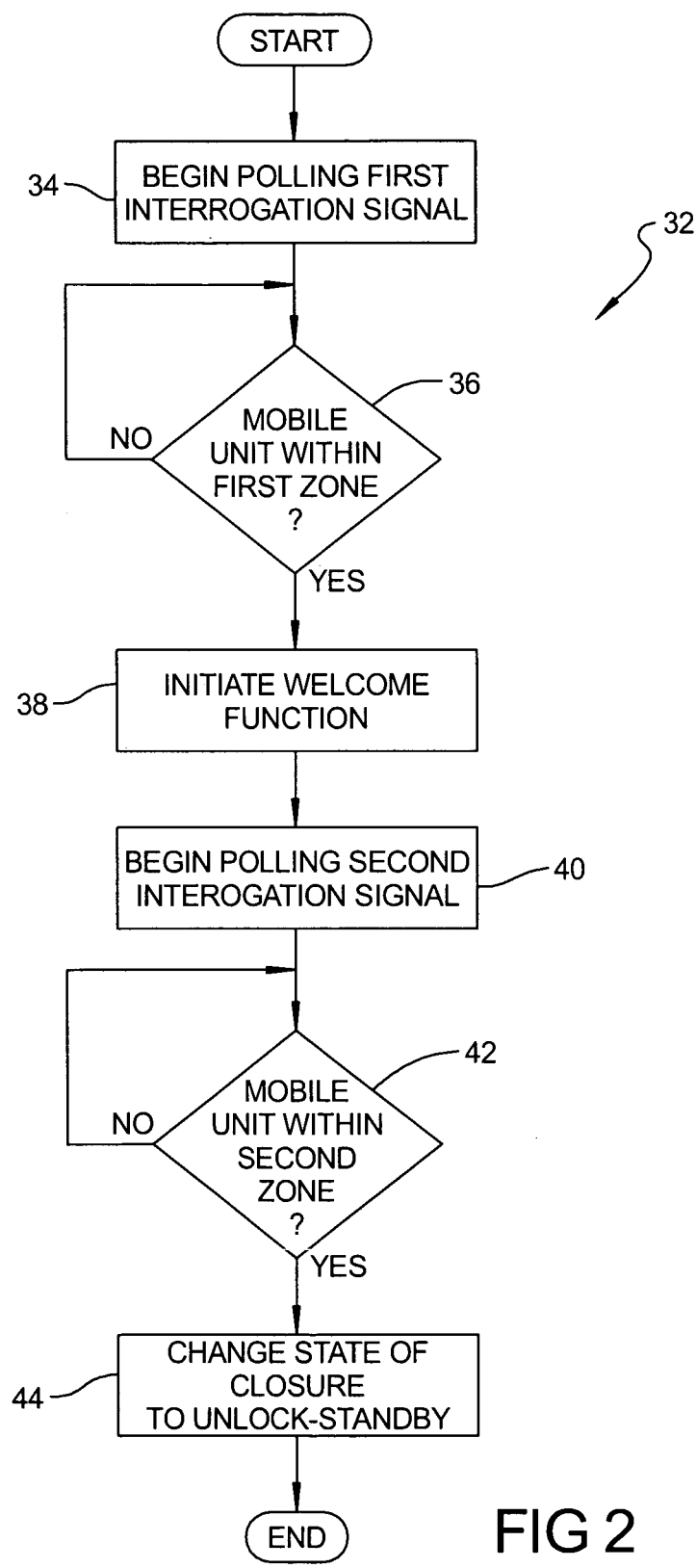
FIG. 2 is a flow chart illustrating a method of operating the vehicle control apparatus of FIG. 1.

Referring now to FIG. 2, a flow chart representing a method 32 of operating the control apparatus 12 is illustrated. The method 32 begins in step 34 in which the first antenna 20 of the detection device 16 begins transmitting the first interrogation signal in a polling fashion. Then, in step 36, it is determined whether the mobile unit 17 is detected within the first zone. If the mobile unit 17 is outside of the first zone, step 36 loops back upon itself. If the mobile unit 17 is detected within the first zone 24, the method 32 continues to step 38. In step 38, the first function (i.e., the "welcome" function) is initiated. As described above, step 38 could be completed by illuminating the light 11, creating a sound with the speaker 19, starting the ignition of the vehicle 10, or otherwise. Then, in step 40, the detection device 16 begins transmitting the second interrogation signal from the second antennae 26. Next, in decision block 42, it is determined whether the mobile unit 17 is within one of the second zones 30. If the mobile unit 17 is not detected within any of the second zones 30, decision block 32 loops back upon itself. If the mobile unit 17 is detected within one of the second zones 30, the method 32 continues to step 44. In step 44, the state of the vehicle closure 14 is changed from a locked state to an unlock-standby state.

While the operative workings of the above teachings have been described using separate sets of equipment, that is, a first antenna 20 and a first receiver 21 and a second antenna 26 and a second receiver 27, the teachings are not limited to such, and as a result, the first and second antenna 20, 26 may be a single antenna, while the first and second receiver 21, 27 may be a single receiver. In such a situation, the function and performance of the apparatus remains the same as described.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of initiating a plurality of vehicle functions comprising the steps of:
    detecting when a mobile unit is within a first zone outside the vehicle by transmitting a first interrogation signal from the vehicle to the mobile unit within the first zone, transmitting a first identification signal from the mobile unit to the vehicle in response to the first interrogation signal, and matching the first identification signal to a first predetermined identifier;
    detecting when the mobile unit is within a second zone outside the vehicle by transmitting a second interrogation signal from the vehicle to the mobile unit within the second zone only after the step of detecting when a mobile unit is within the first zone outside the vehicle, transmitting a second identification signal from the mobile unit to the vehicle in response to the second interrogation signal, and matching the second identification signal to a second predetermined identifier, wherein the first zone encompasses the second zone;
    causing a first vehicle function of illuminating a light within a vehicle interior when the mobile unit is detected within the first zone;
    automatically terminating the first vehicle function when the mobile unit is not detected within the second zone within a predetermined time after the mobile unit is detected within the first zone; and
    maintaining the first vehicle function when the mobile unit is detected within the second zone;
    causing a second vehicle function when the mobile unit is detected within the second zone, the second vehicle function comprising at least one of causing a vehicle closure to enter an unlock-standby state, opening a vehicle closure, energizing an opener switch, and actuating a vehicle ingress/egress device.

2. The method of claim 1, wherein the steps of transmitting the first interrogation signal and first identification signal each comprise transmitting a radio frequency (RF) signal, and wherein the steps of transmitting the second interrogation signal and second identification signal each comprise transmitting a low frequency (LF) signal.

3. The method of claim 1, further comprising the step of terminating the first vehicle function.

4. An apparatus for automatically initiating a plurality of vehicle functions, the apparatus comprising:
    a mobile unit;
    a detection device transmitting a first interrogation signal within a first zone, wherein the mobile unit transmits a first identification signal in response to the first interrogation signal when the mobile unit is disposed within the first zone, wherein the detection device automatically detects whether the mobile unit is within the first zone by matching the first identification to a first predetermined identifier, wherein the detection device transmits a second interrogation signal within a second zone, wherein the mobile unit transmits a second identification signal in response to the second interrogation signal when the mobile unit is disposed within the second zone, wherein the detection device automatically detects whether the mobile unit is within the second zone by matching the second identification to a second predetermined identifier, wherein the first zone and second zone are outside the vehicle and wherein the first zone encompasses the second zone; and
    a controller initiates a vehicle light to illuminate when the detection device detects that the mobile unit is within the first zone, the controller automatically terminates the illumination of the vehicle light after a predetermined time after the mobile unit is not detected within the second zone after the mobile unit has been detected in the first zone, the controller maintains the first function when the mobile unit is detected in the second zone, the controller further initiates a vehicle closure to enter an unlock-standby state when the detection device detects that the mobile unit is within the second zone, wherein the controller creates a sound when the detection device detects that the mobile unit is within the first zone, and wherein the controller initiates a second vehicle function when the detection device detects that the mobile unit is within the second zone, the second vehicle function chosen from a group consisting of opening a vehicle closure, energizing an opener switch, and actuating a vehicle ingress/egress device.

5. The apparatus of claim 4, wherein the first interrogation signal and the first identification signal are radio frequency (RF) signals, and wherein the second interrogation signal and the second identification signal are low frequency (LF) signals.

6. The apparatus of claim 4, wherein the detection device transmits the second interrogation signal only after the detection device detects that the mobile unit is within the first zone.

7. The method of initiating a plurality of vehicle functions according to claim 1, further comprising:
    unlocking the vehicle door when a door handle is contacted by a human hand.

8. The method of initiating a plurality of vehicle functions according to claim 7, wherein the second zone is a zone with a radius of approximately three feet from a vehicle door and wherein only a locking mechanism corresponding to the vehicle door changes from the locked state to an unlocked state.

9. The method of initiating a plurality of vehicle functions according to claim 8, further comprising:
    automatically opening the vehicle door after the vehicle door is placed into an unlocked state.

10. The apparatus of claim 4, further comprising:
a laser emitter, wherein automatically opening the vehicle door further comprises opening the vehicle door using the laser emitter.

11. The apparatus of claim 4, wherein the detection device transmits the second interrogation signal only after the detection device detects that the mobile unit is within the first zone.

12. The apparatus of claim 11, wherein the detection device ceases transmitting the second interrogation when the detection device does not receive the second identification signal within a specified period of time.

13. The apparatus of claim 4, wherein the first interrogation signal and the first identification signal are each radio frequency (RF) signals, and wherein the second interrogation signal and second identification signal are each low frequency (LF) signals.

14. The apparatus of claim 4, wherein the opener switch is a laser emitter and the controller energizes the laser emitter when the mobile unit enters one of the second zones, the laser emitter causing opening of the vehicle closure when a laser of the laser emitter is interrupted.

15. The apparatus of claim 4, wherein the ingress/egress device is a foot step that is actuated away from the vehicle when the mobile unit enters one of the second zones.

16. The apparatus of claim 1, further comprising:
detecting a user action after detecting when the mobile unit is within the second zone; and
unlocking a door when the user action is detected.

17. The apparatus of claim 4, further comprising:
a detector detecting a user action after said detection device detects whether the mobile unit is disposed within the second zone; and
an unlocking device unlocking a door when the user action is detected.

* * * * *

UNITED STATES PATENT AND TRADEMARK OFFICE
CERTIFICATE OF CORRECTION

PATENT NO. : 8,427,276 B2  
APPLICATION NO. : 11/362585  
DATED : April 23, 2013  
INVENTOR(S) : Justin P. McBride et al.

Page 1 of 1

It is certified that error appears in the above-identified patent and that said Letters Patent is hereby corrected as shown below:

Title Page, (75) Inventors: Keiichi Aoyama;  
        address "Novi, MI (US)" should be --Anjo-shi (JP)--

Signed and Sealed this  
Twenty-fifth Day of June, 2013

Teresa Stanek Rea  
*Acting Director of the United States Patent and Trademark Office*